United States Patent [19]
Vetter et al.

[11] Patent Number: 5,381,456
[45] Date of Patent: Jan. 10, 1995

[54] ROTARY-ANODE X-RAY TUBE COMPRISING A SLEEVE BEARING

[75] Inventors: Axel Vetter, Hamburg, Germany; Leonardus P. M. Tielemans, Eersel, Netherlands

[73] Assignee: U.S. Philips Corporation, New York, N.Y.

[21] Appl. No.: 88,466

[22] Filed: Jul. 7, 1993

[30] Foreign Application Priority Data

Jul. 7, 1992 [DE] Germany ............................ 4222225

[51] Int. Cl.6 ............................................... H01J 35/10
[52] U.S. Cl. .................... 378/132; 378/133; 384/100; 384/123
[58] Field of Search ............... 378/132, 119, 121, 125, 378/133, 144; 384/100, 112, 114, 123

[56] References Cited

U.S. PATENT DOCUMENTS

| 4,210,371 | 7/1980 | Gerkema et al. | 308/9 |
| 4,671,676 | 6/1987 | Chen et al. | 384/100 |
| 4,678,348 | 7/1987 | Tielemans et al. | 384/114 |
| 5,077,775 | 12/1991 | Vetter | 378/132 |

FOREIGN PATENT DOCUMENTS

| 0204359 | 12/1986 | European Pat. Off. | |
| 0378274 | 7/1990 | European Pat. Off. | |
| 2852908 | 6/1979 | Germany. | |
| 0172615 | 7/1989 | Japan | 384/100 |
| 0172616 | 7/1989 | Japan | 384/100 |

Primary Examiner—David P. Porta
Attorney, Agent, or Firm—Jack D. Slobod

[57] ABSTRACT

A rotary-anode X-ray tube includes a sleeve bearing having bearing faces which are rotatable relative to one another in a direction of rotation and at least one of which is provided with a pattern of grooves. The service life of such a sleeve bearing can be prolonged by providing the grooves with a recess at their rearmost end, viewed in the direction of rotation.

9 Claims, 2 Drawing Sheets

ROTARY-ANODE X-RAY TUBE COMPRISING A SLEEVE BEARING

BACKGROUND OF THE INVENTION

1. Field of the Invention

The invention relates to a rotary-anode X-ray tube, including a sleeve bearing having bearing faces which are rotatable relative to one another in a direction of rotation and at least one of which is provided with a pattern of grooves.

2. Description of the Related Art

An X-ray tube of this kind is known, for example from EP-A 378 274 which corresponds to U.S. Pat. No. 5,077,775, or from DE-OS 28 52 908. The sleeve bearings of these tubes can operate in a given direction of rotation only. Between the bearing faces which are rotatable relative to one another there is provided a liquid lubricant, for example a gallium alloy.

During steady operation of the sleeve bearing in the relevant direction of rotation, such pressure conditions arise in the lubricant, inter alia under the influence of the groove pattern, that a hydrodynamic lubricant film is formed and the bearing surface cannot contact one another. At the beginning and at the end of the rotation, however, these conditions are not satisfied so that wear phenomena which limit the service life of the bearing may appear.

It is an object of the present invention to construct an X-ray tube of the kind set forth so that the service life of the sleeve bearing is prolonged. This object is achieved in accordance with the invention in that a recess is provided at the rearmost end of the grooves, viewed in the direction of rotation.

The invention is based on the recognition of the fact that particles become detached from the bearing surfaces during the start and landing processes; these particles will also be referred to hereinafter as abrasion particles. The abrasion particles collect at the areas of the grooves in which the highest pressure occurs in the lubricant during rotation of the bearing. This is the rearmost pan of the bearing, viewed in the direction of rotation. In the course of time such a large amount of abrasion particles could collect and be compressed in this part of the grooves that extensive wear can occur at that area, resulting in a breakdown of the bearing.

When the grooves are provided with a recess at that area, a substantially larger quantity of abrasion particles can collect at that area, so that the service life of the bearing is prolonged. The recess, extending over only a comparatively small pan of the overall length of the grooves, has an insignificant effect only on the bearing capacity of the bearing and can be taken into account right from the start of design. The recess should be provided only in the grooves, but not in the ridges between the grooves.

It is to be noted that from EP-A 204 359 there is already known a sleeve bearing comprising a groove pattern with a varying depth of the grooves. This bearing is a sleeve bearing for a horizontally positioned shaft which is journalled in a bearing sleeve. The groove depth therein varies continuously in the circumferential direction so that at the area where the bearing is exposed to the highest load, the depth of the grooves is smallest. As a result, the bearing has its highest bearing capacity at that area. However, the aim is not to prolong the service life of such a bearing nor is such a prolongation achieved by the described steps.

In an embodiment of the invention, one of the bearing faces is provided with a groove pattern in two adjoining areas, the grooves in one area extending towards the grooves in the other area at an angle which deviates from 180° C. and which is preferably an acute angle, said grooves terminating at the boundary between the areas and a recess being provided in the grooves at their end near the boundary. In another embodiment of the invention, however, one of the bearing faces is provided with a pattern of grooves which extend in the direction perpendicular to the axis of rotation, which grooves start at the outer side and terminate at the inner side, viewed in the direction of rotation, the inner ends of the grooves opening into a ting-shaped or circular recess. In this case the rear part of the grooves, viewed in the direction of rotation, is situated at its inner end, so that the recess must be provided at that area.

BRIEF DESCRIPTION OF THE DRAWING

The invention will be described in detail hereinafter with reference to the drawing. Therein.

DETAILED DESCRIPTION OF THE PREFERRED EMBODIMENTS

Figure 1:
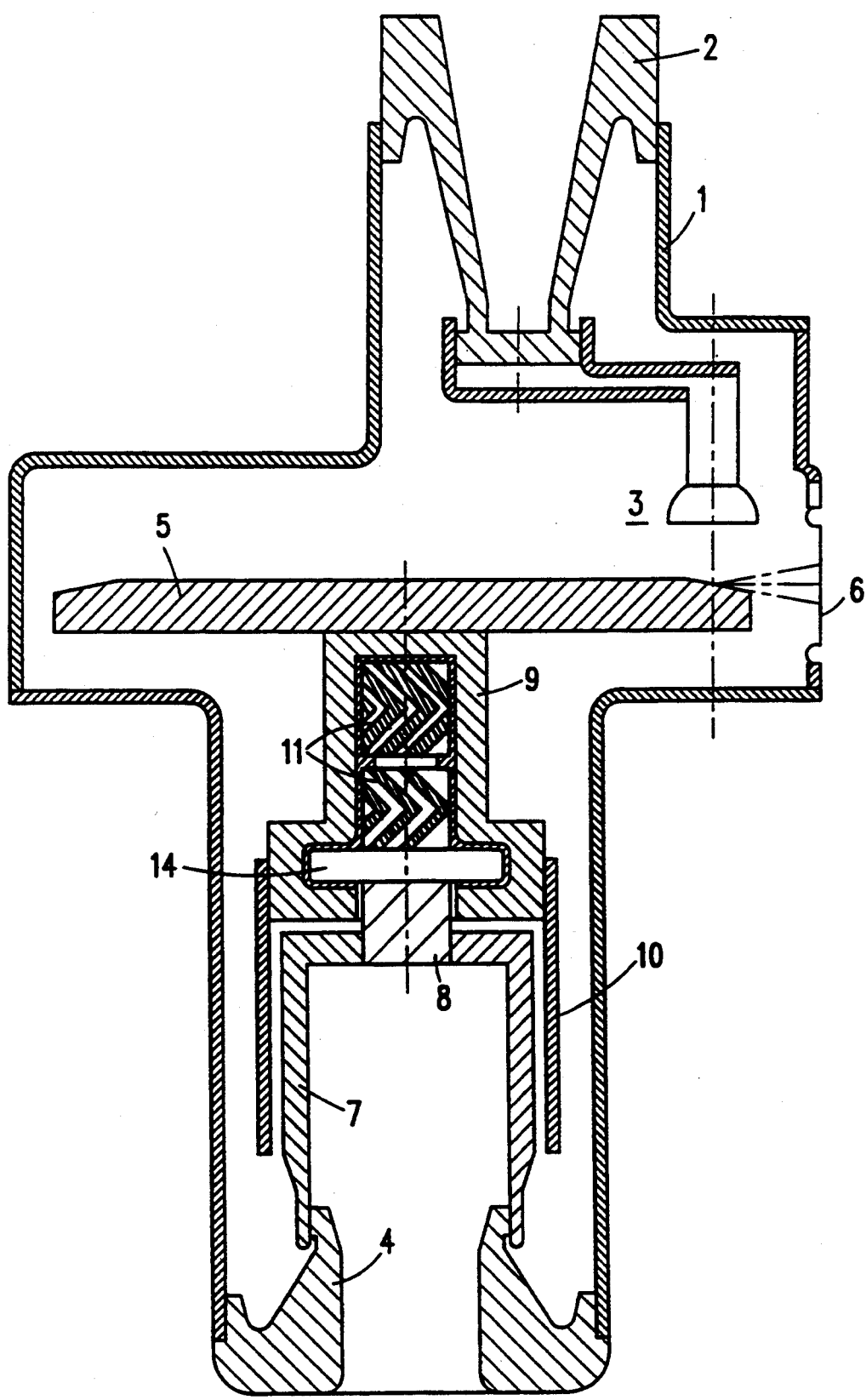
FIG. 1 shows an embodiment of an X-ray tube comprising sleeve bearings in accordance with the invention.

The rotary-anode X-ray tube shown in FIG. 1 comprises a metal envelope 1 whereto the cathode 3 is connected via a first insulator 2 and whereto the rotary-anode is connected via a second insulator 4. The rotary anode comprises an anode disc 5 on whose side which faces the cathode 3 there are generated X-rays when a high voltage is switched on. The X-rays can emanate from the envelope through a radiation exit window 6 which preferably consists of beryllium. The anode disc 5 is connected, via a beating arrangement, to a support 7 which is connected to the second insulator 4. The bearing arrangement comprises a bearing shaft 8 which is rigidly connected to the support 7 and a bearing shell 9 which concentrically encloses the bearing shaft 8 and the lower end of which is provided with a rotor for driving the anode disc 5 connected to its upper end. The bearing shaft 8 and the bearing shell 9 are made of a molybdenum alloy (YZM). Instead, however, use can be made of molybdenum or a tungsten-molybdenum alloy.

At its upper end the bearing shaft 8 is provided with two fishbone-like groove patterns 11 which are offset relative to one another in the axial direction and which serve to take up radial forces. The cylindrical gap between the groove patterns 11 and the bearing shell 9 is filled with a liquid lubricant, preferably a gallium alloy. The width of the gap corresponds, for example to the depth of the grooves and may amount to from 10 $\mu$m to 30 $\mu$m in practice. When the rotary anode rotates in the prescribed direction of rotation, the lubricant is transported to the area of the groove pattern where the grooves pair-wise meet. At that area a pressure is built up in the lubricant, which pressure is capable of taking up forces acting radially on the bearing.

Figure 2A:
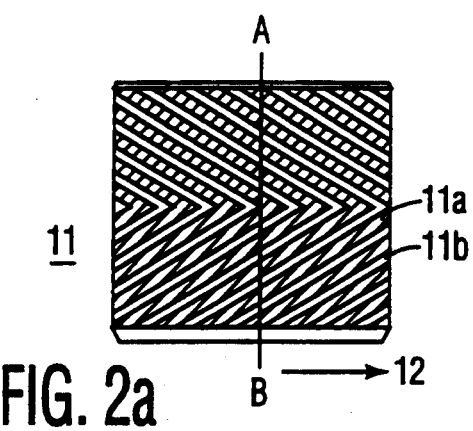
FIGS. 2a and 2b show a sleeve bearing for taking up radial forces in a side elevation and a cross-sectional view.

FIG. 2a shows a part of a development of the bearing shaft 8 at the area of one of the groove patterns 11. The grooves 11a are shown in black and the intermediate ridges 11b are shown in white. The grooves and ridges have at least approximately the same width which may be between 0.1 and 1 mm. The depth of the grooves as well as the width of the gap between the groove pattern and the bearing shell 9 determine, in conjunction with other parameters, the bearing capacity of the bearing (the smaller these dimensions are, the higher the bearing capacity will be). The groove pattern consists of pairs of helical grooves which extend towards one another at an acute angle and which terminate at the area where they meet. At that area the highest lubricant pressure occurs when the bearing shell 9 moves relative to the groove pattern in the direction of the arrow 12. Lubricant is pumped to that area and abrasion particles formed in the course of operation of the sleeve bearing are also deposited at that area. Therefore, a recess 13 as shown in FIG. 2b is provided at this area of the groove pattern.

Figure 2B:
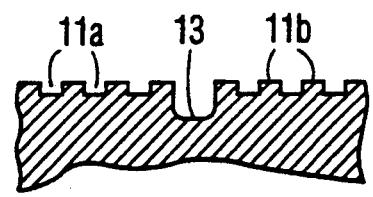

FIG. 2b is a cross-sectional view of the surface of the groove pattern, taken along the line A-B; however, fewer grooves are shown for the sake of simplicity. In comparison with their width these grooves are shown to be much deeper than they are in reality. The depth of the recess 13 at the centre of the groove pattern, i.e. each time at the area where the two grooves of a pair meet or terminate, is approximately from two to three times greater than the groove depth outside this area. The dimensions of the recess 13 in the longitudinal direction of the grooves should amount to from two to three times the groove width. Because the recesses thus extend only over a small part of the overall length of the grooves, the bearing capacity of the bearings is only insignificantly affected. When the bearing capacity of the bearing is conceived to be high from the beginning, the recess may also be longer in the longitudinal direction.

Because of the recess 13, a substantial larger quantity of abrasion particles can collect in the end zone of the grooves, so that it will take much longer before this zone is filled with abrasion particles. The service life of the bearing is thus prolonged accordingly.

The formation of the recess 13 is comparatively simple when the grooves are cut into the shaft 8 by means of a laser as described in German Patent Application P 42 06 002.8. The cutting power of the laser need merely be increased at that area, or the speed of advancement of the laser beam relative to the shaft 8 must be reduced.

Adjacent to the area provided with groove patterns 11 for the radial bearing, the shaft 8 comprises a section 14 which has a thickness of several millimeters, and whose diameter is substantially greater than the diameter of the remainder of the bearing shaft 8. This section is succeeded by a section whose diameter corresponds at least approximately to the diameter of the upper section of the bearing axis 8 and which is connected to the support 7. The inner contour of the bearing shell 9 is adapted to the section 14. At this area the bearing shell 9 should consist of at least two parts which should be joined so that no lubricant can escape.

The free end faces at the top and the bottom of the section 14 are provided with groove patterns, thus forming further sleeve bearings which serve to take up bearing forces acting in the axial direction.

Figure 3A:
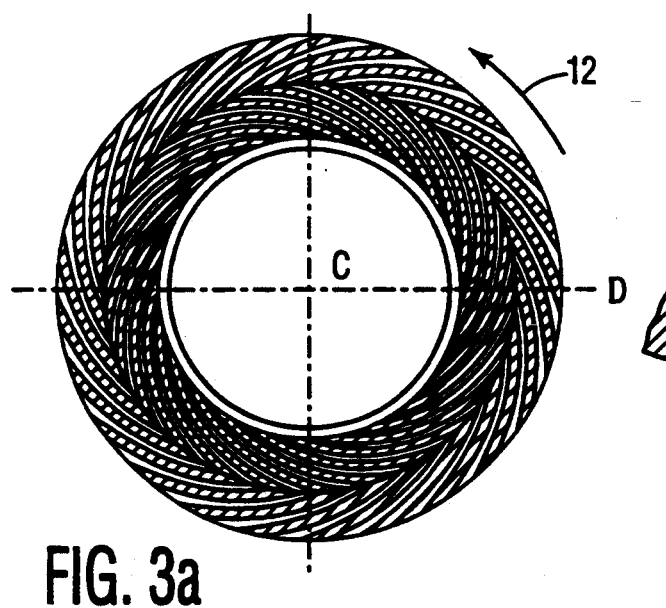
FIGS. 3a and 3b show a first embodiment of a sleeve bearing for taking up axial forces in a plan view and a cross-sectional view.
Figure 3B:
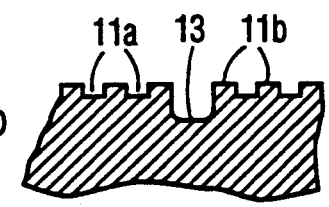

FIG. 3a is a plan view of such a groove pattern, the arrow 12 denoting the direction of rotation of the bearing shell relative to the groove pattern. The groove pattern is composed of pairs of grooves extending towards one another. However, the course of these grooves is not linear but preferably curved as curved pieces of two, oppositely directed (logarithmic) spirals. In this bearing the lubricant and the abrasion particles are again forced into the area where the grooves of a pair meet. In accordance with FIG. 3b, showing the surface of a cross-section taken along the line C-D in FIG. 3a, a recess 13 is provided at this area, said recess being formed and operating in the same way as described with reference to FIG. 2.

The bearing faces shown in the FIGS. 2 and 3 have in common that they comprise grooves in two adjoining areas, which grooves extend towards the grooves in the respective other area at an acute angle and terminate together with one of the latter grooves. When they are offset relative to one another in the circumferential direction, however, the grooves at the areas can also terminate at the boundaries between the areas, without opening into one of the grooves of the other area. In that case the recess should again be provided at the end of the grooves which is near the boundary.

Figure 4A:
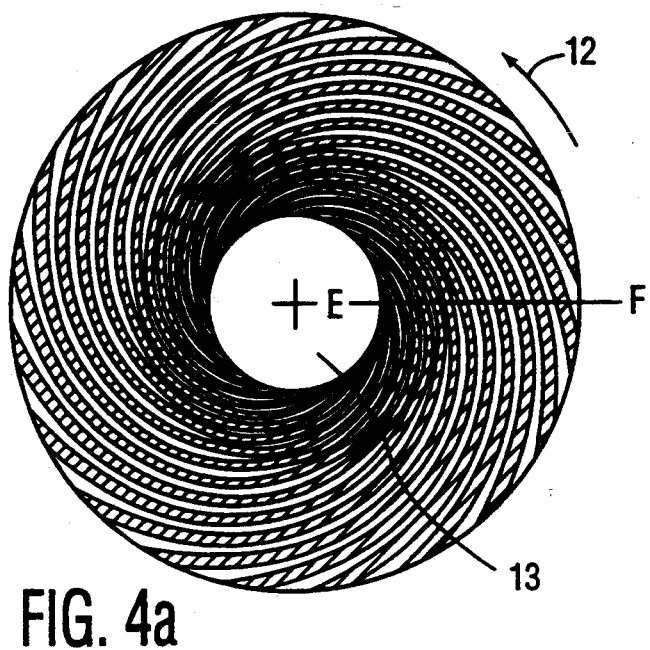
FIGS. 4a and 4b show a further embodiment of a sleeve bearing for taking up axial forces in a plan view and a cross-sectional view.

FIG. 4 shows another embodiment of a groove pattern suitable for a sleeve bearing for taking up axial beating forces. Such a groove pattern could be provided, for example on the upper end face of the bearing shaft 8. Like the groove pattern shown in FIG. 3, the groove pattern shown in FIG. 4a covers an annular zone around the axis of rotation. Whereas grooves in FIG. 3 are curved pieces of two spirals extending around the axis of rotation in opposite directions, the embodiment shown in FIG. 4 utilizes only curved pieces of logarithmic spirals which extend around the centre of rotation in the same direction (clock-wise). The arrow 12 again denotes the direction of movement 12 of the bearing shell relative to the groove pattern for which it develops its bearing force. The lubricant and the abrasion particles are then pumped inwards into the grooves, the highest lubricant pressure occurring at the inner end so that the particles are deposited at that area. For prolongation, each groove could be provided with a recess at this rearmost end, viewed in the direction of rotation.

Figure 4B:
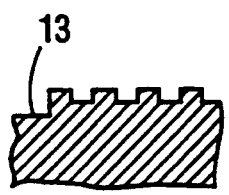

However, as appears from FIG. 4b, showing a cross-section of the surface taken along the line E-F in FIG. 4a, all grooves open together into a circular recessed area 13 so that manufacture is simplified. Instead of a circular recess 13 coveting the entire inner area, there could also be provided a ring-shaped recess into which the grooves open.

In the described bearings the groove pattern is always provided in a stationary bearing face; however, the groove pattern can also be provided in a bearing face which rotates in the operating condition. In that case the recess should again be provided at the relevant rearmost part of the groove, i.e. at the part of the groove which last passes a defined point or radial radius in the other bearing face.

We claim:

1. A rotary-anode X-ray tube, comprising a sleeve bearing having bearing faces which are rotatable relative to one another in a direction of rotation and at least one of which is provided with a pattern of grooves, characterized in that a recess is provided at the rearmost end of the grooves, viewed in the direction of rotation for collecting abrasion particles, the depth of the recess being greater than the depth of the grooves.

2. A rotary-anode X-ray tube as claimed in claim 1, characterized in that one of the bearing faces is provided with a groove pattern in two adjoining areas, the grooves in one area extending towards the grooves in the other area at an angle which deviates from 180° and which is preferably an acute angle, said grooves terminating at the boundary between the areas and a recess being provided in the grooves at their end near the boundary.

3. A rotary-anode X-ray tube as claimed in claim 1, characterized in that one of the bearing faces is provided with a pattern of grooves which extend in the direction perpendicular to the axis of rotation, which grooves start at the outerside and terminate at the innerside, viewed in the direction of rotation, the inner ends of the grooves opening into a ring-shaped or circular recess.

4. A rotary-anode X-ray tube, comprising a sleeve bearing having bearing faces which are rotatable relative to one another in a direction of rotation and at least one of which is provided with a pattern of grooves, characterized in that a recess is provided at the rearmost end of the grooves, viewed in the direction of rotation, the depth of the recess amounting to approximately twice the depth of the grooves.

5. A rotary-anode X-ray tube as claimed in claim 4, characterized in that one of the bearing faces is provided with a groove pattern in two adjoining areas, the grooves in one area extending towards the grooves in the other area at an angle which deviates from 180° and which is preferably an acute angle, said grooves terminating at the boundary between the areas and a recess being provided in the grooves at their end near the boundary.

6. A rotary-anode X-ray tube as claimed in claim 4, characterized in that one of the bearing faces is provided with a pattern of grooves which extend in the direction perpendicular to the axis of rotation, which grooves start at the outerside and terminate at the innerside, viewed in the direction of rotation, the inner ends of the grooves opening into a ring-shaped or circular recess.

7. A rotary-anode X-ray tube, comprising a sleeve bearing having bearing faces which are rotatable relative to one another in a direction of rotation and at least one of which is provided with a pattern of grooves, characterized in that a recess is provided at the rearmost end of the grooves, viewed in the direction of rotation, the recess extending in the longitudinal direction of the grooves over a distance equal to from two to three times the groove width.

8. A rotary-anode X-ray tube as claimed in claim 7, characterized in that one of the bearing faces is provided with a groove pattern in two adjoining areas, the grooves in one area extending towards the grooves in the other area at an angle which deviates from 180° and which is preferably an acute angle, said grooves terminating at the boundary between the areas and a recess being provided in the grooves at their end near the boundary.

9. A rotary-anode X-ray tube as claimed in claim 7, characterized in that one of the bearing faces is provided with a pattern of grooves which extend in the direction perpendicular to the axis of rotation, which grooves start an the outerside and terminate at the innerside, viewed in the direction of rotation, the inner ends of the grooves opening into a ring-shaped or circular recess.

* * * * *